(12) United States Patent
Sajima (10) Patent No.: US 7,321,330 B2
(45) Date of Patent: Jan. 22, 2008

(54) BALL MEASURING APPARATUS

(75) Inventor: Takahiro Sajima, Kobe (JP)

(73) Assignee: SRI Sports Limited, Kobe-shi (JP)

( * ) Notice: Subject to any disclaimer, the term of this patent is extended or adjusted under 35 U.S.C. 154(b) by 0 days.

(21) Appl. No.: 11/448,925

(22) Filed: Jun. 8, 2006

(65) Prior Publication Data

US 2007/0075891 A1 Apr. 5, 2007

(30) Foreign Application Priority Data

Oct. 3, 2005 (JP) ............................. 2005-289771
Oct. 3, 2005 (JP) ............................. 2005-290023

(51) Int. Cl.
*G01S 13/42* (2006.01)
*A63B 69/36* (2006.01)
*G01S 13/00* (2006.01)

(52) U.S. Cl. ............................. 342/59; 342/52; 342/55; 342/118; 342/126; 342/146; 342/147; 342/175; 342/195; 342/196; 473/150; 473/151; 473/152; 473/198; 473/199

(58) Field of Classification Search ............ 342/52–59, 342/73–81, 104–115, 118, 126–147, 175, 342/189–197, 450–465; 473/198–200, 351, 473/353, 150–172, 223
See application file for complete search history.

(56) References Cited

U.S. PATENT DOCUMENTS

| 4,673,183 | A | * | 6/1987 | Trahan | 473/152 |
| 5,138,322 | A | * | 8/1992 | Nuttall | 342/126 |
| 5,209,483 | A | * | 5/1993 | Gedney et al. | 473/223 |
| 5,246,232 | A | * | 9/1993 | Eccher et al. | 473/199 |
| 5,363,297 | A | * | 11/1994 | Larson et al. | 342/126 |
| 5,401,026 | A | * | 3/1995 | Eccher et al. | 473/199 |
| 6,181,271 | B1 | | 1/2001 | Hosaka et al. | |
| 6,292,130 | B1 | * | 9/2001 | Cavallaro et al. | 342/104 |
| 6,456,232 | B1 | * | 9/2002 | Milnes et al. | 342/107 |
| 2004/0141056 | A1 | | 7/2004 | Izumi et al. | |

FOREIGN PATENT DOCUMENTS

| EP | 0585101 A2 | * | 3/1994 |
| GB | 2154146 A | * | 9/1985 |
| GB | 2269288 A | * | 2/1994 |
| GB | 2283144 A | * | 4/1995 |
| JP | 11-72558 A | | 7/1989 |
| JP | 2953672 B2 | | 9/1999 |

(Continued)

*Primary Examiner*—Bernarr E. Gregory
(74) *Attorney, Agent, or Firm*—Birch, Stewart, Kolasch & Birch, LLP (57) ABSTRACT

The present invention provides a ball measuring apparatus capable of measuring a trajectory of a ball from a hitting position to a landing position, the landing position and a stop position. A ball measuring apparatus 100 according to a first embodiment includes a first millimeter wave radar device 1 capable of carrying out a measurement from the hitting position to a predetermined position of the trajectory and having at least one transmitting antenna and a plurality of receiving antennas, and a second millimeter wave radar device 2 capable of measuring the stop position and having at least one transmitting antenna and a plurality of receiving antennas. A ball measuring apparatus 101 according to a second embodiment has a millimeter wave radar device 31 and a CCD camera 32.

7 Claims, 9 Drawing Sheets

FOREIGN PATENT DOCUMENTS

| | | |
|---|---|---|
| JP | 2001-145718 A | 5/2001 |
| JP | 2002-207077 A | 7/2002 |
| JP | 2003-042716 A | 2/2003 |
| JP | 2004-227111 A | 8/2004 |
| WO | WO-92/09337 A1 | 6/1992 |

* cited by examiner

BALL MEASURING APPARATUS

This application claims priority on Patent Application No. 2005-289771 filed in JAPAN on Oct. 3, 2005 and Patent Application No. 2005-290023 filed in JAPAN on Oct. 3, 2005, the entire contents of which are hereby incorporated by reference.

BACKGROUND OF THE INVENTION

1. Field of the Invention

The present invention relates to an apparatus for measuring a trajectory and a flight distance of a ball and more particularly to a ball measuring apparatus which is suitable for measuring a trajectory and a flight distance of a golf ball.

2. Description of the Related Art

As an apparatus for measuring a trajectory of a golf ball, conventionally, an apparatus using a CCD camera has been proposed. Japanese Laid-Open Patent Publication No. 2001-145718 has disclosed an apparatus for measuring a trajectory of a ball using at least one CCD camera for detecting a maximum point and at least one CCD camera for detecting a drop point. Japanese Laid-Open Patent Publication No. 2003-42716 has disclosed an apparatus for measuring a trajectory of a ball which comprises at least two CCD cameras provided behind a hitting position and ahead of a target position and a calculating portion for calculating coordinates of a position of the ball by the triangulation technique.

Moreover, Japanese Patent No. 2953672 has disclosed a golf apparatus for measuring an initial velocity of a golf ball by using a radar and presuming a carry from the initial velocity of the ball which is measured. The measuring apparatus using the radar is utilized as means for detecting a distance to an object, a velocity of the object and the like. For a type of the radar, a laser radar, a millimeter-wave radar or the like is used. Since the millimeter wave radar is influenced by a bad weather such as rain or fog, it is utilized in some fields. Japanese Laid-Open Patent Publication No. 2004-227111 has disclosed a security system for detecting an invader by using the millimeter wave radar. Japanese Laid-Open Patent Publication No. 2002-207077 has disclosed a running support apparatus for a car which comprises radar means for detecting a distance from an object positioned ahead of the car by using the millimeter wave radar. Japanese Laid-Open Patent Publication No. 11-72558 has disclosed a landing inducing apparatus to be used when accurately inducing a flight vehicle to a landing space by using the millimeter wave radar.

The apparatus for measuring a trajectory by means of a camera is easily influenced by a weather such as rain or fog and a brightness. The millimeter wave radar can carry out a measurement which is rarely influenced by the weather. Furthermore, the millimeter wave radar can carry out the measurement at night without an illumination. However, it has been found that the trajectory and flight distance of the ball cannot be measured with high precision by simply using the millimeter wave radar.

SUMMARY OF THE INVENTION

A ball measuring apparatus according to the present invention can measure a trajectory of a ball from a hitting position to a landing position, the landing position and a stop position and comprises a first millimeter wave radar device capable of carrying out a measurement from the hitting position to a predetermined position of the trajectory and including at least one transmitting antenna and a plurality of receiving antennas, a second millimeter wave radar device capable of measuring the stop position and including at least one transmitting antenna and a plurality of receiving antennas, and a calculating portion for calculating three-dimensional coordinates of the ball based on signals received by the receiving antennas, wherein the first millimeter wave radar device and the second millimeter wave radar device are placed in different positions from each other.

It is preferable that the transmitting antenna and the receiving antenna in the first millimeter wave radar device should be disposed in a height of 0 to 5 m from a ground behind the hitting position, and the transmitting antenna and the receiving antenna in the second millimeter wave radar device should be disposed in a height of 2 to 20 m from the ground behind the hitting position.

It is preferable that a beam width in a horizontal direction of the first millimeter wave radar device should be set to be equal to or greater than 10 degrees and to be equal to or smaller than 90 degrees and a beam width in a vertical direction of the first millimeter wave radar device should be set to be greater than 0 degree and to be equal to or smaller than 90 degrees. Moreover, it is preferable that a beam width in a horizontal direction of the second millimeter wave radar device should be set to be equal to or greater than 10 degrees and to be equal to or smaller than 90 degrees and a beam width in a vertical direction of the second millimeter wave radar device should be set to be greater than 0 degree and to be equal to or smaller than 90 degrees.

Another ball measuring apparatus according to the present invention can measure a trajectory of a ball from a hitting position to a landing position, the landing position and a stop position and comprises a millimeter wave radar device capable of measuring the trajectory and including at least one transmitting antenna and a plurality of receiving antennas, a CCD camera capable of measuring the stop position, a calculating portion for a radar which serves to calculate three-dimensional coordinates of the ball based on signals received by the receiving antennas, and a calculating portion for a camera which serves to calculate coordinates of the stop position based on image data of the CCD camera, wherein the millimeter wave radar device and the CCD camera are placed in different positions from each other.

It is preferable that the CCD camera should be disposed in a height of 2 to 20 m from a ground. It is preferable that a beam width in a horizontal direction of the millimeter wave radar device should be set to be equal to or greater than 10 degrees and to be equal to or smaller than 90 degrees. It is preferable that a beam width in a vertical direction of the millimeter wave radar device should be set to be equal to or greater than 10 degrees and to be equal to or smaller than 90 degrees.

The ball measuring apparatus can measure a trajectory and a flight distance with high precision while suppressing the influence of a weather and a brightness.

DESCRIPTION OF THE PREFERRED EMBODIMENTS

The present invention will be described below in detail based on preferred embodiments with reference to the accompanying drawings.

Figure 1:
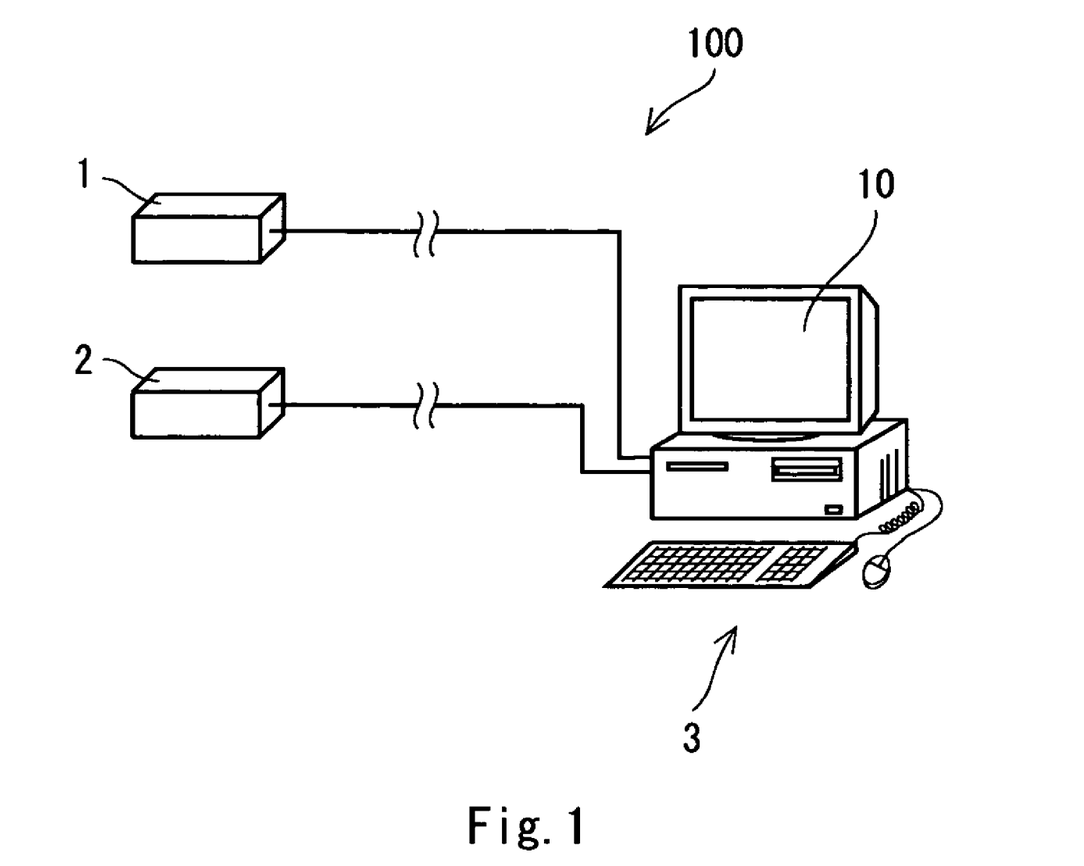
FIG. 1 is a schematic view showing a structure of a ball measuring apparatus according to an embodiment of the present invention.

As shown in FIG. 1, a ball measuring apparatus 100 according to a first embodiment of the present invention comprises a first millimeter wave radar device 1, a second millimeter wave radar device 2 and a computer portion 3. The first millimeter wave radar device 1 and the second millimeter wave radar device 2 are directly connected to the computer portion 3, respectively.

Figure 2:
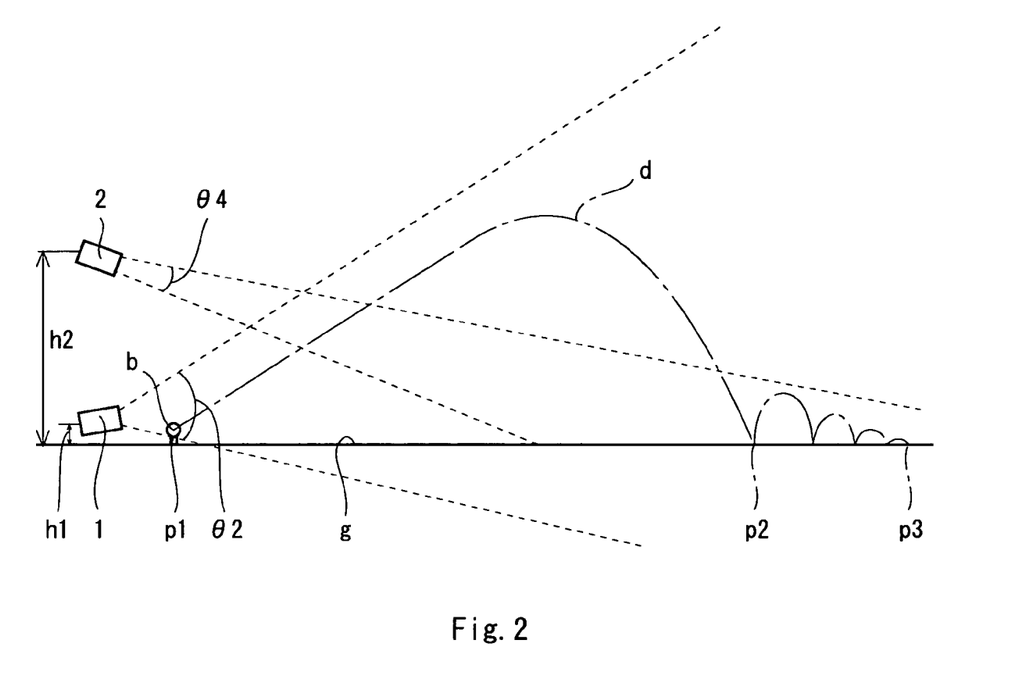
FIG. 2 is a side view showing an arrangement of a radar device in the ball measuring apparatus according to the embodiment of the present invention.
Figure 3:
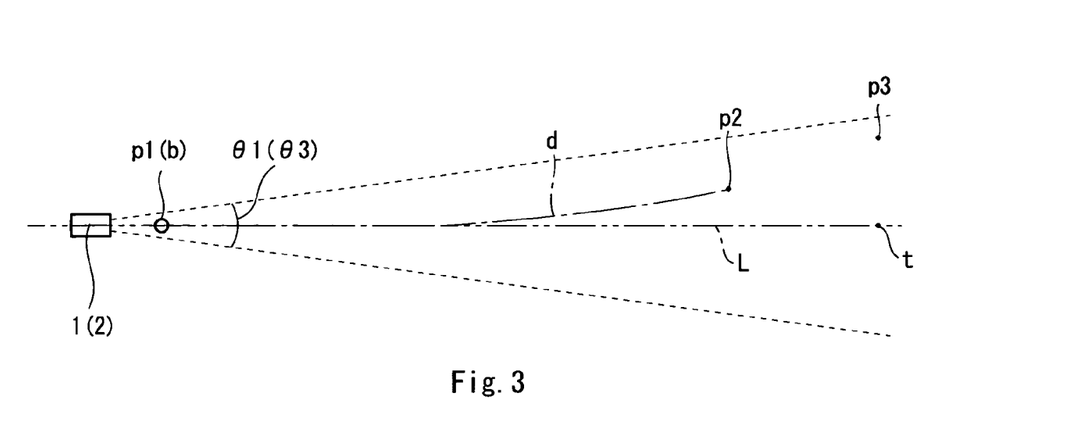
FIG. 3 is a plan view showing the arrangement of the radar device in the ball measuring apparatus according to the embodiment of the present invention.
Figure 4:
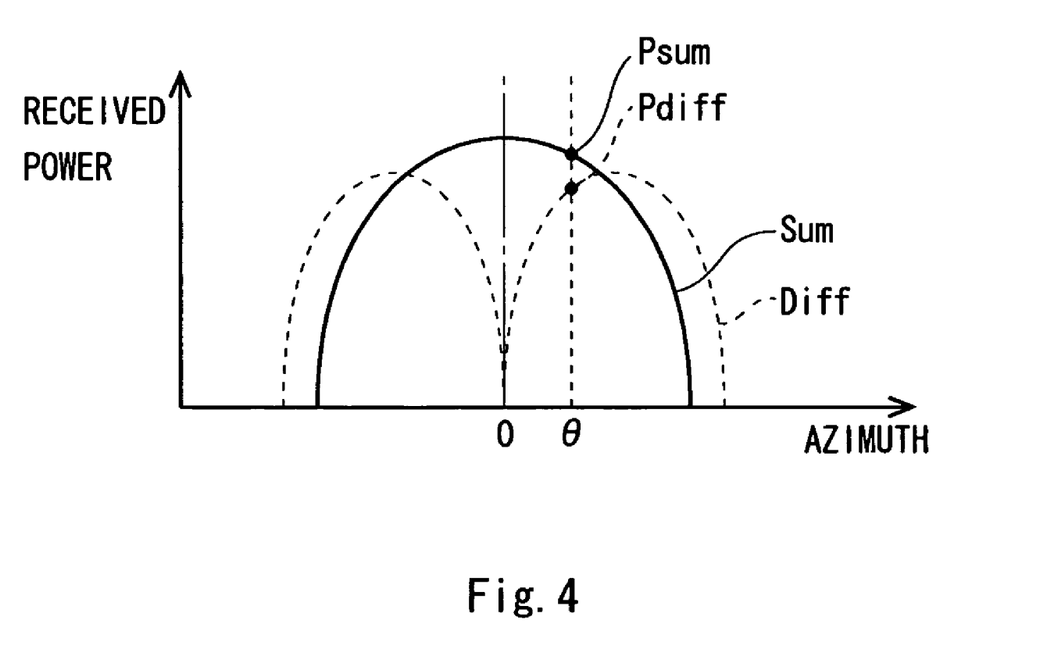
FIG. 4 is a graph showing a received power pattern for an azimuth of a ball in the case in which two receiving antennas are provided.

FIGS. 2 and 3 are views showing the relationship of an arrangement between a trajectory d of a golf ball b to be hit, and the radar device 1 and the radar device 2, FIG. 3 is a side view and FIG. 4 is a plan view seen from above. When the golf ball b put stationarily in a hitting position p1 is hit by a golf club which is not shown, it flies by describing the predetermined trajectory d. A starting point of the trajectory d is the hitting position p1 and an end point of the trajectory d is a landing position p2. The golf ball b landing in the landing position p2 rolls while bounding over a ground g, and stops at a stop position p3.

The ball measuring apparatus 100 can measure the trajectory d of the ball b from the hitting position p1 to the landing position p2, the landing position p2 and the stop position p3. The radar device 1 can carry out a measurement from the hitting position p1 to a predetermined position of the trajectory d. The predetermined position of the trajectory d is a middle position of the trajectory d from the hitting position p1 to the landing position p2 or the landing position p2. The radar device 2 can carry out a measurement from the predetermined position to the stop position p3. If the radar device 1 can carry out the measurement from the hitting position p1 to the landing position p2, it is sufficient that the radar device 2 can measure only the stop position p3. By adapting measurement data of a plurality of radar devices, it is preferable that the whole trajectory d, the landing position p2 and the stop position p3 should be measured.

Particularly important items of the measurement include the trajectory d, a carry and a total. The carry indicates a distance from the hitting position p1 to the landing position p2. The total indicates a distance from the hitting position p1 to the stop position p3. A movement of the ball b from the landing position p2 to the stop position p3 (a bounding or rolling track) has a comparatively low importance for the measurement items. The ball measuring apparatus according to the present invention can exclude the movement of the ball b from the landing position p2 to the stop position p3 (the bounding or rolling track) from a measuring target. Essential items of the measurement include a track of the trajectory from the hitting position p1 to the landing position p2, the landing position p2 and the stop position p3. As a matter of course, the movement of the ball b from the landing position p2 to the stop position p3-(the bounding or rolling track) may be measured.

In the case in which the trajectory d is measured by sharing at least two radar devices, a range in which the radar devices can carry out the measurement is duplicated at least partially. The trajectory d is measured within the duplicated measuring enable range of each of the radar devices so that the measurement data obtained by the radar devices are duplicated at least partially. By utilizing the duplicated measurement data, it is possible to join the measurement data of the radar device 1 and those of the radar device 2. Based on the data thus joined, one trajectory d is described. The ball measuring apparatus 100 has a data processing portion (not shown) for joining the measurement data of the radar devices by utilizing the duplicated measurement data. The data processing portion is provided in the computer portion 3 or the radar devices 1 and 2, for example.

The radar device 1 and the radar device 2 are disposed in suitable positions for the measurement, respectively. As shown in FIGS. 2 and 3, it is preferable that the radar device 1 should be disposed behind the hitting position p1. The radar device 1 may be disposed in the vicinity of the hitting position p1 (for example, beside the hitting position p1). It is more preferable that the radar device 1 should be disposed in the vicinity of a rearward extended line of a line L connecting the hitting position p1 to a target position t (see FIG. 3). It is preferable that the radar device 2 should be disposed behind the hitting position p1. The radar device 2 may be disposed in the vicinity of the hitting position p1. It is more preferable that the radar device 2 should be disposed in the vicinity of the rearward extended line of the line L connecting the hitting position p1 to the target position t. Moreover, it is preferable that the radar device 2 should be disposed in a higher position than the radar device 1. The radar device 2 may be disposed above the radar device 1.

In the case in which the radar devices 1 and 2 are disposed behind the hitting position p1, it is preferable that the radar devices 1 and 2 should be disposed behind the hitting position p1 at a distance of 1 to 10 m. When a distance in a longitudinal direction from the hitting position p1 is set to be equal to or greater than 1 m, a measuring enable range in the vicinity of the hitting position p1 is enlarged so that a change in a launch angle is permitted easily. By setting the distance in the longitudinal direction from the hitting position p1 to be equal to or smaller than 10 m, a distance between the ball b and the radar device is reduced so that precision in the measurement can be enhanced.

In the case in which the radar devices 1 and 2 are provided behind the hitting position p1, it is preferable that a distance in a transverse direction between the radar devices 1 and 2 and the line L connecting the hitting position p1 to the target position t should be set to be 0 to 5 m. By setting the distance to be equal to or smaller than 5 m, a beam width can easily be disposed uniformly in a transverse direction with respect to the line L. It is more preferable that the radar devices 1 and 2 should be disposed on the extension of the line L.

The radar device 1 and the radar device 2 have the same specifications. While description will be properly given by taking the radar device 1 as an example, the radar device 2 is the same.

Figure 5:
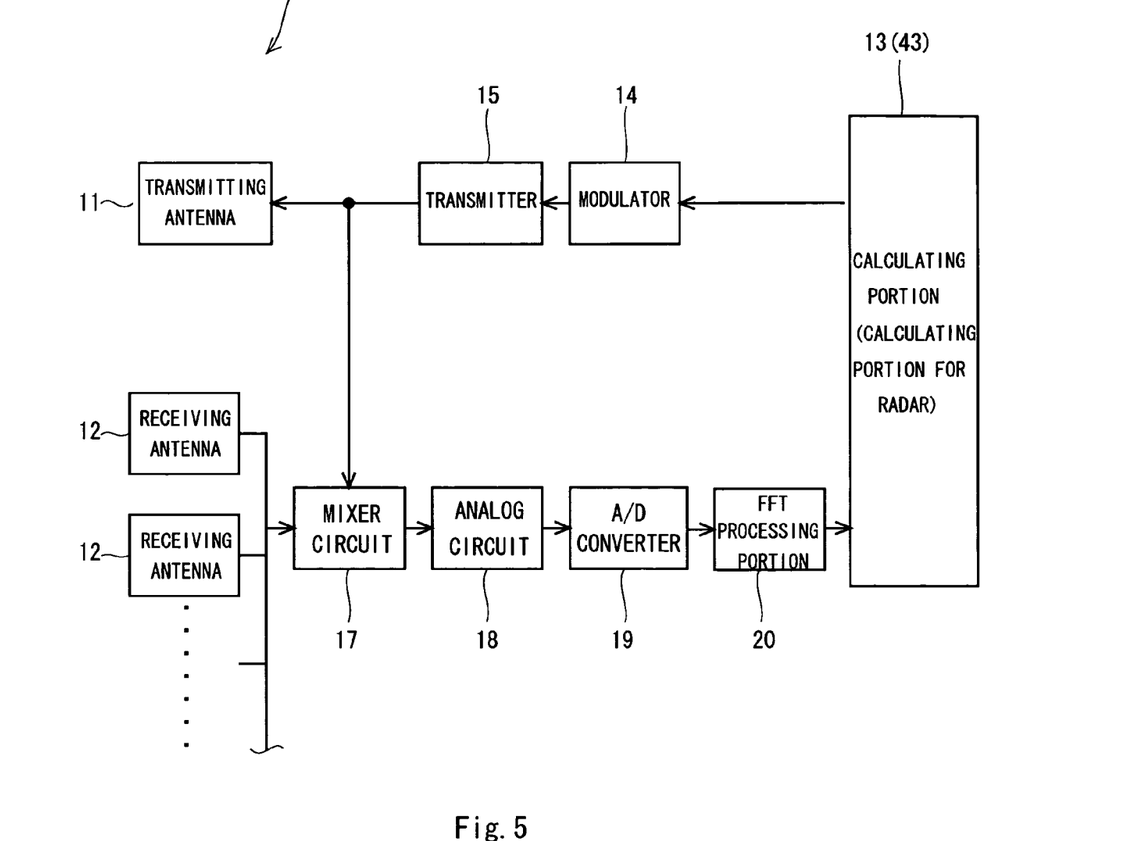
FIG. 5 is a diagram showing an example of the structure of the ball measuring apparatus.

As shown in FIG. 5, the radar device 1 includes a transmitting antenna 11 and a receiving antenna 12. An electric wave (a pulse) transmitted from the transmitting antenna 11 hits on the ball b and the receiving antenna 12 receives the electric wave reflected and returned from the ball b. Based on a signal (an electric wave) received through the receiving antenna 12, three-dimensional coordinates of the ball b are calculated. The three-dimensional coordinates of the ball b are calculated based on three-dimensional information such as a three-dimensional azimuth or a three-dimensional velocity of the ball b. The three-dimensional coordinates of the ball b are calculated by a calculating portion 13. The computer portion 3 includes the calculating portion 13. The calculating portion 13 includes a predetermined software, and a CPU and a memory in the computer portion 3 for operating the software, for example. The calculating portion 13 may be provided in the radar device 1.

The calculating portion 13 calculates three-dimensional coordinates at each time of the ball b based on information obtained from a wave reflected by the ball b. The trajectory d of the ball b obtained based on the three-dimensional coordinates at each time is displayed on a display portion 10. A typical example of the display portion 10 is a monitor. In the embodiment shown in FIG. 1, the computer portion 3 includes the monitor to be the display portion 10. The display portion 10 may be provided separately from the computer portion 3. The three-dimensional coordinates of the ball b at each time are plotted continuously so that the trajectory d is described. For the trajectory d, the trajectory d seen from a side (as shown in FIG. 2) and the trajectory d seen on a plane (as shown in FIG. 3) are described, for example. The display portion 10 can display the trajectory d seen from the side and the trajectory d seen on the plane at the same time. The trajectory d is displayed in an almost real time.

In the ball measuring apparatus 100, the radar device 1 and the radar device 2 are disposed in different positions from each other. The different positions are useful for measuring the flight of the ball within a wider range with high precision. As shown in FIG. 2, it is preferable that the radar device 1 and the radar device 2 should be disposed behind the hitting position p1. The rearward arrangement from the hitting position p1 causes the trajectory d of the ball b to be easily caught within a wide range.

In the case in which the radar device is disposed in the vicinity of the hitting position p1, the measurement is apt to be carried out with difficulty in the vicinity of the landing position. The ball measuring apparatus 100 causes the measurement to be shared by the two radar devices 1 and 2. The radar device 1 carries out a measurement from at least the hitting position p1 to an initial stage of the trajectory d. The radar device 2 measures at least the stop position p3. By joining the measurement data obtained by the radar device 1 and the measurement data obtained by the radar device 2, it is possible to obtain measurement data on the trajectory d of the ball from the hitting position p1 to the landing position p2, the landing position p2 and the stop position p3.

The radar device 1 can carry out the measurement from the hitting position p1 to a predetermined position of the trajectory d. The predetermined position may be the middle of the trajectory d (the aerial position) or the landing position p2. The radar device 2 can carry out the measurement from the predetermined position to the stop position p3. In the case in which the predetermined position is the landing position p2, the radar device 2 can be caused to carry out only the measurement of the stop position p3. In the embodiment shown in FIG. 2, the radar device 1 and the radar device 2 are disposed on the hitting position p1 side. Differently therefrom, the radar device 1 may be disposed on the hitting position p1 side and the radar device 2 may be disposed on the landing position p2 side. More specifically, the radar device 1 may be disposed behind the hitting position p1 and the radar device 2 may be disposed ahead of the stop position p3, for example.

As shown in FIG. 2 the radar device 2 is disposed in a higher position than the radar device 1. By the disposition in the comparatively high position, the stop position p3 can easily be measured by the radar device 2. The radar device 1 is disposed in a lower position than the radar device 2. By the disposition in the comparatively low position, the trajectory d can easily be measured by the radar device 1.

It is preferable that a height h1 (see FIG. 2) of the radar device 1 from the ground g should be set to be 0 to 5 m. This height is advantageous for catching the trajectory d of the ball b flying from the hitting position p1 within a wider range. The height h1 can be properly regulated by the shape, height and flight distance of the trajectory d which are predicted, and the like. A height h2 of the radar device 2 from the ground g is set to be 2 to 20 m. This height is suitable for catching the ball b after landing with high precision in the vicinity of the hitting position p1. The height h2 can be properly regulated by the shape, height and flight distance of the trajectory d which are predicted, and the like.

The radar devices 1 and 2 are set into a measuring enable state before hitting. At the same time that the hitting is carried out in the state thus set, the radar devices 1 and 2 automatically recognize the moving ball b as a measuring target and start to measure the ball b. The radar devices 1 and 2 do not react to an object which does not move in a measuring enable region but automatically recognize only the moving object as the measuring target. It is not necessary to give the radar devices 1 and 2 a trigger signal for controlling a timing for fetching data.

A golf club head, a golf club shaft or the like which collides with the ball b can be a moving object in the measuring enable regions of the radar devices 1 and 2. Accordingly, the head and the shaft can also be measured by the radar devices 1 and 2. Measurement data on the moving object (the head or the like) other than the ball b are distinguished from data on the ball b. The ball measuring apparatus 100 has a processing portion (not shown) for distinguishing the ball b from objects other than the ball b in the measured moving objects. The processing portion distinguishes the moving objects other than the ball b from the ball b based on a characteristic movement of the ball b flying by describing a predetermined trajectory. For example, the golf club head carries out an almost circular motion with the movement of the golf club to be swung, while the ball b collides with the head and is then launched forward in a direction and a velocity which are definitely different from those of the head. Accordingly, the trajectory d of the ball b can be clearly distinguished from the head. The processing portion recognizes the characteristic movement of the ball b which is obtained immediately after the collision with the head and decides the movement to be an impact. The three-dimensional coordinates of the ball b at a time that the movement is decided to be the impact become the starting point of the trajectory d. In the case in which an insect, a bird or the like flies within the measuring enable ranges of the radar devices 1 and 2, the processing portion can distinguish the insect, the bird or the like from the trajectory d. The reason is that the flying track of the insect, the bird or the like usually has a shape or a velocity which is definitely different from that of the trajectory d of the ball b. The processing portion distinguishes and selects only the data on the ball b in the data on the measured moving objects. The processing portion includes a predetermined software, and the CPU and the memory in the computer portion 3 for operating the software, for example. The processing portion may be provided in the radar devices 1 and 2.

The landing position p2 can be recognized as a point at which the velocity of the ball b is changed discontinuously. The stop position p3 can be recognized as a point at which the velocity of the ball b approximates to zero without limit. At the same time that the velocity of the ball b becomes zero, the ball b is excluded from the measuring target of the radar device. However, it is possible to recognize the point at which the ball b approximates to zero without limit. The ball measuring apparatus 100 has a recognizing portion (not shown) for recognizing the landing position p2 and the stop position p3 based on the change in the velocity of the ball b. The recognizing portion includes a predetermined software, and the CPU and the memory in the computer portion 3 for operating the software, for example. The recognizing portion may be provided in the radar devices 1 and 2.

In the radar device 1 and the radar device 2, the antennas are fixed without a rotation. The radar device 1 and the radar device 2 are disposed in such a manner that all of the whole trajectory d, the landing position p2 and the stop position p3 can easily be contained in the measuring range.

The sizes of the measuring enable regions of the radar device 1 and the radar device 2 depend on a beam width. The moving object within the beam width can be measured with high precision. The beam width is represented by a half width of a power, for example. The half width indicates an angular width set before a power transmitted from the transmitting antenna is reduced to a half of the greatest value observed in front of the radar.

It is preferable that the radar device 1 should be disposed in such a manner that a region from the starting point of the predicted trajectory d to the end point thereof (from the hitting position p1 to the landing position p2) is contained in the beam width. It is preferable that the radar device 2 should be disposed in such a manner that both of the landing position p2 and the stop position p3 which are predicted are contained in the beam width.

A beam width $\theta_1$ (see FIG. 3) in a horizontal direction of the radar device 1 is set to be equal to or greater than 10 degrees and to be equal to or smaller than 90 degrees. A beam width $\theta_2$ (see FIG. 2) in a vertical direction of the radar device 1 is set to be greater than zero degree and to be equal to or smaller than 90 degrees. By setting the beam width $\theta_1$ to be equal to or greater than 10 degrees, the whole trajectory d can easily be contained in the beam width of the radar device 1 also in the case in which the trajectory d bends transversely. It is more preferable that the beam width $\theta_1$ should be set to be equal to or greater than 20 degrees. By setting the beam width $\theta_1$ to be equal to or smaller than 90 degrees, a transmitted electric wave can be prevented from being diffused excessively so that precision in the measurement can be enhanced. It is more preferable that the beam width $\theta_1$ should be set to be equal to or smaller than 80 degrees.

When the beam width $\theta_2$ is set to be greater than 0 degree, a tolerance for a shift in a longitudinal direction of the stop position p3 is increased. It is more preferable that the beam width $\theta_2$ should be set to be equal to or greater than 5 degrees. By setting the beam width $\theta_2$ to be equal to or smaller than 90 degrees, the transmitted electric wave can be prevented from being diffused excessively so that the precision in the measurement can be enhanced. It is more preferable that the beam width $\theta_2$ should be set to be equal to or smaller than 80 degrees.

A beam width $\theta_3$ (see FIG. 3) in a horizontal direction of the radar device 2 is set to be equal to or greater than 10 degrees and to be equal to or smaller than 90 degrees. A beam width $\theta_4$ (see FIG. 2) in a vertical direction of the radar device 2 is set to be greater than zero degree and to be equal to or smaller than 90 degrees. By setting the beam width $\theta_3$ to be equal to or greater than 10 degrees, the whole trajectory d can easily be contained in the beam width of the radar device 2 also in the case in which the trajectory d bends transversely. It is more preferable that the beam width $\theta_3$ should be set to be equal to or greater than 5 degrees. By setting the beam width $\theta_3$ to be equal to or smaller than 90 degrees, the transmitted electric wave can be prevented from being diffused excessively so that the precision in the measurement can be enhanced. It is more preferable that the beam width $\theta_3$ should be set to be equal to or smaller than 80 degrees.

When the beam width $\theta_4$ is set to be greater than 0 degree, the tolerance for the shift in the longitudinal direction of the stop position p3 is increased. It is more preferable that the beam width $\theta_4$ should be set to be equal to or greater than 5 degrees. By setting the beam width $\theta_4$ to be equal to or smaller than 90 degrees, the transmitted electric wave can be prevented from being diffused excessively so that the precision in the measurement can be enhanced. It is more preferable that the beam width $\theta_4$ should be set to be equal to or smaller than 80 degrees.

While the beam width $\theta_1$ of the radar device 1 and the beam width $\theta_3$ of the radar device 2 are displayed with an overlap in FIG. 3, it is a matter of course that an angle and an arrangement may be varied between both of the beam widths $\theta_1$ and $\theta_3$.

As shown in FIG. 3, the radar device 1 is disposed in such a manner that the beam width $\theta_1$ is almost laterally symmetrical about the line L connecting the hitting position p1 to the target position t. The laterally symmetrical disposition can enhance the tolerance of the measurement for the transverse bend of the trajectory d.

A position in which the radar device is to be disposed is not particularly restricted. The position in which the radar device is to be disposed is not restricted to be placed behind the hitting position p1 as shown in FIG. 2 but may be placed ahead of the target position t. The first radar device may be provided on the hitting position p1 side and the second radar device may be provided on the target position t side. The radar device may be provided in an intermediate position of the hitting position p1 and the target position t. The number of the radar devices to be provided is not particularly restricted but is two or more.

Figure 7:
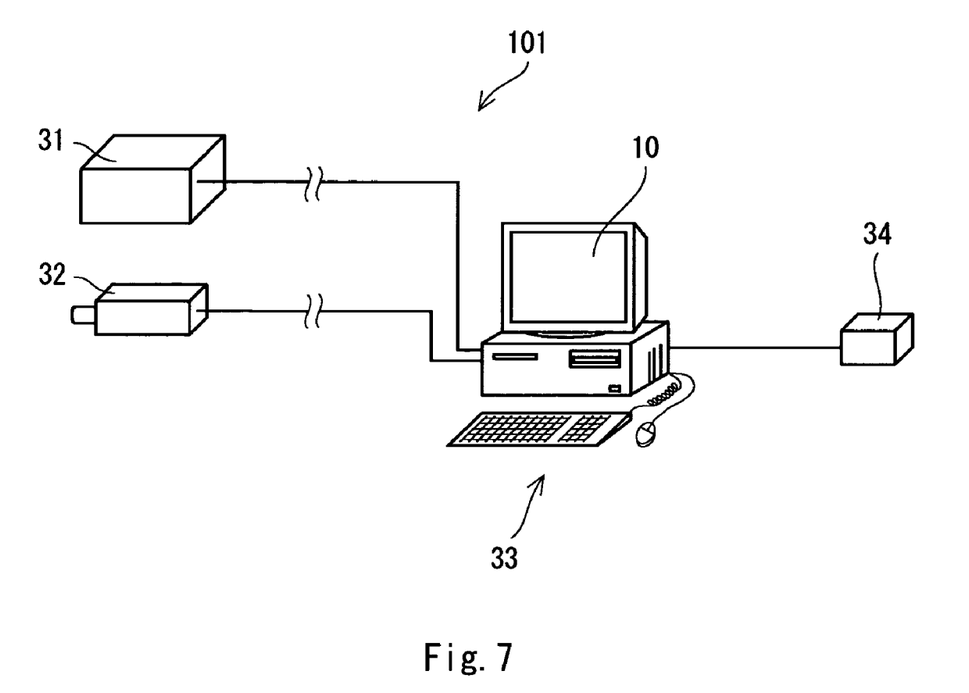
FIG. 7 is a schematic view showing a structure of a ball measuring apparatus according to another embodiment of the present invention.

FIG. 7 is a view showing a schematic structure of a ball measuring apparatus 101 according to a second embodiment of the present invention. The ball measuring apparatus 101 comprises a millimeter wave radar device 31, a CCD camera 32, a computer portion 33, and a trigger portion 34. The millimeter wave radar device 31 is directly connected to the computer portion 33. The CCD camera 32 is coupled to the computer portion 33 through a cable compensator (not shown) if necessary.

Figure 8:
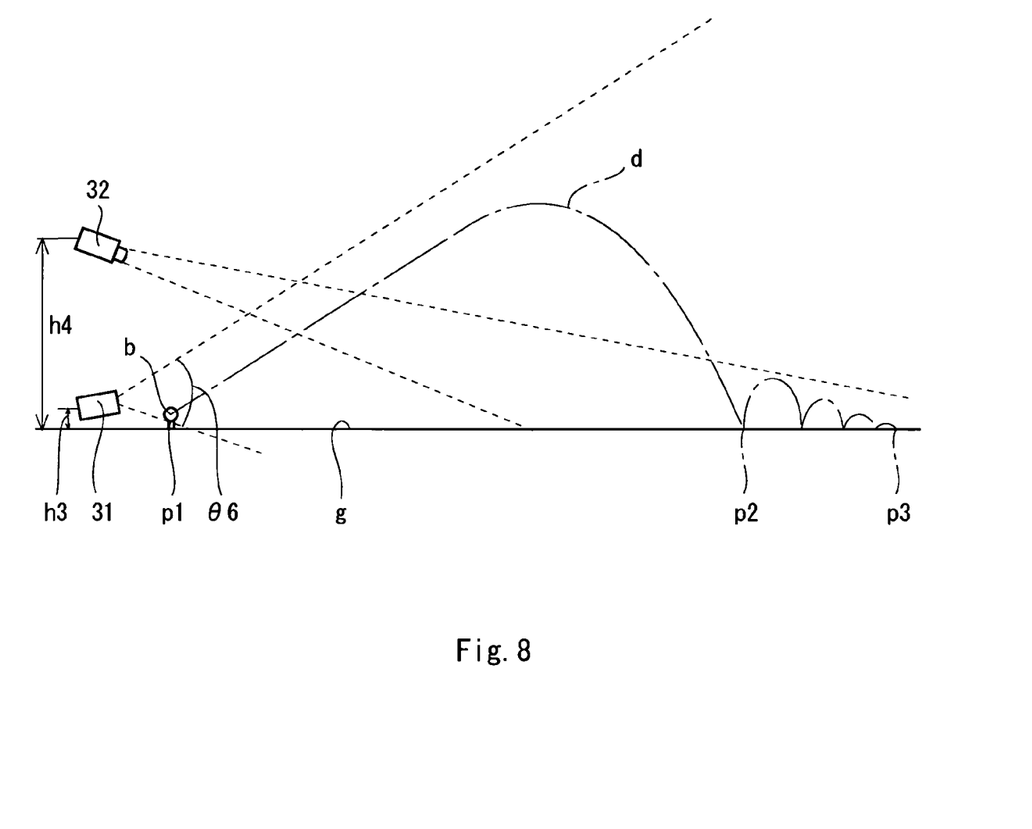
FIG. 8 is a side view showing an arrangement of a radar device in the ball measuring apparatus according to another embodiment of the present invention.
Figure 9:
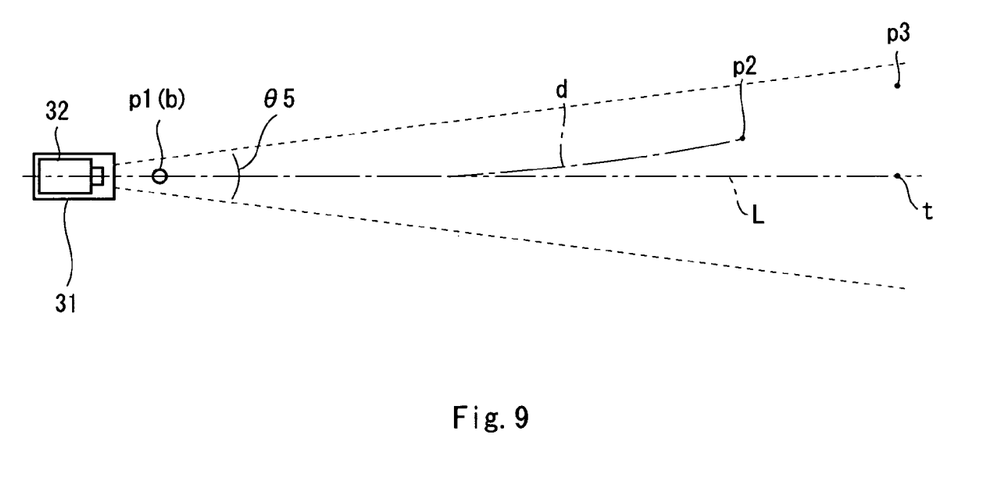
FIG. 9 is a plan view showing the arrangement of the radar device in the ball measuring apparatus according to another embodiment of the present invention.

FIGS. 8 and 9 are views showing the relationship of an arrangement between a trajectory d of a golf ball b to be hit, and the radar device 31 and the CCD camera 32. FIG. 8 is a side view and FIG. 9 is a plan view seen from above. When the golf ball b put stationarily in a hitting position p1 is hit by a golf club which is not shown, it flies by describing the predetermined trajectory d. The trajectory d is a track obtained during the flight of the ball b. A starting point of the trajectory d is the hitting position p1 and an end point of the trajectory d is a landing position p2. The golf ball b landing in the landing position p2 rolls while bounding over a ground g, and stops at a stop position p3.

The ball measuring apparatus 101 can measure the trajectory d of the ball b from the hitting position p1 to the landing position p2, the landing position p2 and the stop position p3. In the ball measuring apparatus 101, the radar device 31 serves to measure the trajectory d and the CCD camera 32 serves to measure the stop position p3. The radar device 31 can carry out a measurement from the hitting position p1 to the landing position p2. The radar device 31 serves to measure the whole trajectory d. The trajectory d may be measured by means of a plurality of radar devices. The CCD camera 32 serves to measure the stop position p3. The CCD camera 32 may measure the landing position p2 in addition to the stop position p3. A plurality of CCD cameras may be provided. The CCD camera 32 may measure the track of the ball b (a bound or a roll) from the landing position p2 to the stop position p3. One of the CCD cameras may measure the landing position p2 and the other CCD cameras may measure the stop position p3.

Particularly important items of the measurement include the trajectory d, a carry and a total. The carry indicates a distance from the hitting position p1 to the landing position p2. The total indicates a distance from the hitting position p1 to the stop position p3. A movement of the ball b from the landing position p2 to the stop position p3 has a comparatively low importance for the measurement items. The ball measuring apparatus according to the present invention can exclude the movement of the ball b from the landing position p2 to the stop position p3 (the bounding or rolling track) from a measuring target. Essential items of the measurement include a track of the trajectory d from the hitting position p1 to the landing position p2, the landing position p2 and the stop position p3. As a matter of course, the movement of the ball b from the landing position p2 to the stop position p3 (the bounding or rolling track) may be measured. More specifically, a result of the measurement of the trajectory d is a set of a large number of three-dimensional coordinate data at each time of the ball b measured every predetermined time period.

In the case in which the trajectory d is measured by sharing at least two radar devices, a range in which the radar devices can carry out the measurement is duplicated at least partially. The trajectory d is measured within the duplicated measuring enable range so that the measurement data obtained by the radar devices are duplicated at least partially. By utilizing the duplicated measurement data, it is possible to join the measurement data of one of the radar devices and those of the other radar devices. Based on the data thus joined, one trajectory d is described. A data processing portion for joining the measurement data of the radar devices may be provided.

The radar device 31 and the CCD camera 32 are disposed in suitable positions for the measurement, respectively. As shown in FIGS. 8 and 9, it is preferable that the radar device 31 should be disposed behind the hitting position p1. The radar device 31 may be disposed in the vicinity of the hitting position p1 (for example, beside the hitting position p1). It is more preferable that the radar device 31 should be disposed in the vicinity of a rearward extended line of a line L connecting the hitting position p1 to a target position t (see FIG. 9). The CCD camera 32 is disposed behind the hitting position p1. The CCD camera 32 may be disposed in the vicinity of the hitting position p1. It is preferable that the CCD camera 32 should be disposed in the vicinity of the rearward extension of the line L connecting the hitting position p1 to the target position t. Moreover, the CCD camera 32 may be disposed in a higher position than the radar device 31. The CCD camera 32 may be disposed above the radar device 31. An optical axis of the CCD camera 32 is turned toward the vicinity of the target position t.

In the case in which the radar device 31 is disposed behind the hitting position p1, it is preferable that the radar device 31 should be disposed behind the hitting position p1 at a distance of 1 to 10 m. When a distance in a longitudinal direction from the hitting position p1 is set to be equal to or greater than 1 m, a measuring enable range in the vicinity of the hitting position p1 is enlarged so that a change in a launch angle is permitted easily. By setting the distance in the longitudinal direction from the hitting position p1 to be equal to or smaller than 10 m, a distance between the ball b and the radar device is reduced so that precision in the measurement can be enhanced.

It is preferable that a distance in a transverse direction between the radar device 31 and the line L connecting the hitting position p1 to the target position t should be set to be 0 to 5 m. By setting the distance to be equal to or smaller than 5 m, abeam width can easily be disposed uniformly in a transverse direction with respect to the line L. It is more preferable that the radar device 31 should be disposed on the extension of the line L.

As shown in FIG. 5, the radar device 31 includes a transmitting antenna 11 and a receiving antenna 12. An electric wave (a pulse) transmitted from the transmitting antenna 11 hits on the ball b and the receiving antenna 12 receives a wave reflected from the ball b. Based on a signal (an electric wave) received through the receiving antenna 12, three-dimensional coordinates of the ball b are calculated. The three-dimensional coordinates of the ball b are calculated based on three-dimensional information such as a three-dimensional azimuth or a three-dimensional velocity of the ball b. The three-dimensional coordinates of the ball b are calculated by a calculating portion 43 for a radar. The computer portion 33 includes the calculating portion 43 for a radar. The calculating portion 43 for a radar includes a predetermined software, and a CPU and a memory in the computer portion 33 for operating the software, for example. The calculating portion 43 for a radar may be provided in the radar device 31. The radar device 31 has the same specification as the radar device 1.

The calculating portion 43 for a radar calculates three-dimensional coordinates at each time of the ball b based on information obtained from the wave reflected by the ball b. The trajectory d of the ball b obtained based on the three-dimensional coordinates at each time is displayed on a display portion 10. A typical example of the display portion 10 is a monitor. In the embodiment shown in FIG. 7, the computer portion 33 includes the monitor to be the display portion 10. The display portion 10 may be provided separately from the computer portion 33. The three-dimensional coordinates of the ball b at each time are plotted continuously so that the trajectory d is described. For the trajectory d, the trajectory d seen from a side (as shown in FIG. 8) and the trajectory d seen on a plane (as shown in FIG. 9) are described, for example. The trajectory d is displayed in an almost real time.

In the ball measuring apparatus 101, the radar device 31 and the CCD camera 32 are disposed in different positions from each other. The different positions can cause a measurement to be carried out within a wider range with high precision. As shown in FIG. 8, the radar device 31 and the CCD camera 32 are disposed behind the hitting position p1, for example. The rearward arrangement from the hitting position p1 causes the trajectory d of the ball b to be easily caught within a wide range.

In the case in which the radar device is disposed in the vicinity of the hitting position p1, the measurement is apt to be carried out with difficulty in the vicinity of the stop position p3. The ball measuring apparatus 101 causes the measurement to be shared by the radar device 31 and the CCD camera 32. The radar device 31 can measure the whole trajectory d (from the hitting position p1 to the landing position p2) by itself. The CCD camera 32 measures at least the stop position p3. By joining the measurement data obtained by the radar device 31 and the measurement data obtained by the CCD camera 32, it is possible to obtain measurement data on the trajectory d of the ball from the hitting position p1 to the landing position p2, the landing position p2 and the stop position p3.

In the embodiment shown in FIG. 8, the radar device 31 and the CCD camera 32 are disposed on the hitting position p1 side. Differently therefrom, the radar device 31 may be disposed on the hitting position p1 side and the CCD camera 32 may be disposed on the landing position p2 side. More specifically, the radar device 31 may be disposed behind the hitting position p1 and the CCD camera 32 may be disposed ahead of the stop position p3, for example.

As shown in FIG. 8, the CCD camera 32 is disposed in a higher position than the radar device 31. By the disposition in the comparatively high position, the stop position p3 can easily be measured by the CCD camera 32. The radar device 31 is disposed in a lower position than the CCD camera 32. By the disposition in the comparatively low position, the whole trajectory d can easily be contained in the measuring enable range of the radar device 31.

It is preferable that a height h3 (see FIG. 8) of the radar device 31 from the ground g should be set to be 0 to 5 m. This height is advantageous for catching the trajectory d of the ball b flying from the hitting position p1 within a wider range. The height h3 can be properly regulated by the shape, height and flight distance of the trajectory d which are predicted, and the like. A height h4 of the CCD camera 32 from the ground g is set to be 2 to 20 m. This height is suitable for catching the ball b after landing with high precision in the vicinity of the hitting position p1. The height h4 can be properly regulated by the shape, height and flight distance of the trajectory d which are predicted, and the like.

The radar device 31 is set into a measuring enable state before hitting. At the same time that the hitting is carried out in the state thus set, the radar device 31 automatically recognizes the moving ball b as a measuring target and starts to measure the ball b. The radar device 31 does not react to the object which does not move within the measuring enable region but automatically recognizes only the moving object as a measuring target. It is not necessary to give the radar device 31 a trigger signal for controlling a timing for fetching data.

Image data fetched from the CCD camera 32 are recorded on an image recording portion (not shown). The computer portion 33 has an image recording portion. A timing for the CCD camera 32 to fetch data is controlled by the trigger portion 34 (see FIG. 7). The trigger portion 34 generates a trigger signal to be a measuring start signal. The trigger portion 34 includes a sensor such as a shielding optical sensor. The sensor is provided in the vicinity of the hitting position p1 and is constituted to detect a passage of a golf club or that of the hit ball b. When the hit of the ball b is detected, an instruction for starting a recording operation is given to the image recording portion. A predetermined time is required for reaching the landing position p2 or the stop position p3 after the ball b is hit. For this reason, it is preferable that a proper interval should be set from the detection of the hit to the instruction for starting the recording operation. Therefore, the computer portion 33 has a counter (not shown) for measuring a time required from the detection of the hit to the instruction for starting the recording operation and a recording control portion (not shown) forgiving an instruction for recording to the image recording portion after a predetermined time passes since the detection of the hit based on counting carried out by the counter.

Coordinates of the stop position p3 and the like are obtained from the image data acquired from the CCD camera 32. The computer portion 33 has a calculating portion for a camera (not shown) which serves to calculate the coordinates of the stop position p3 based on the image data of the CCD camera 32. By photographing a reference point having coordinates known by means of the CCD camera 32, it is possible to relate a position on a two-dimensional image obtained by the CCD camera 32 to an actual coordinate position. The calculating portion for a camera calculates the three-dimensional coordinates of the stop position p3 based on the relation of the position on the two-dimensional image obtained by the CCD camera 32 and the actual coordinate position.

In the conventional measuring apparatus using the CCD camera described above, the trajectory d is measured by means of the CCD camera. Therefore, it is impossible to prevent a sky from being a background. In the ball measuring apparatus 101, the trajectory d in the air is measured by the radar device 31. Therefore, it is possible to prevent an image from being picked up with the sky to be the background. A background for photographing the ball b by the CCD camera 32 is the ground g. The ball b can be recognized more easily with an image obtained by setting the ground g to be the background than an image obtained by setting the sky to be the background. As compared with the conventional art using the CCD camera, therefore, the ball measuring apparatus 101 can reduce the influence of a weather and that of a brightness more greatly and can enhance precision in a measurement.

In order to cause the image of the ball b obtained by the CCD camera 32 to be clearer, the computer portion 33 may have image processing means. The image processing means carries out a differential peak hold calculation over image data recorded in the image recording portion in order of a frame. More specifically, only an image memory of a peak having a change in a pixel of each frame memory is held and a memory having no change is erased. An image of a golf ball is whiter than the background and becomes the whitest portion in a decision of a shade. Therefore, the background is erased by the image processing so that image data having only the golf ball image left can be generated.

A golf club head, a golf club shaft or the like which collides with the ball b can be a moving object in the measuring enable region of the radar device 31. Accordingly, the head and the shaft can also be measured by the radar device 31. Measurement data on the moving object (the head or the like) other than the ball b are distinguished from data on the ball b. The ball measuring apparatus 101 has a processing portion (not shown) for distinguishing the ball b from objects other than the ball b in the measured moving objects. The processing portion distinguishes the moving objects other than the ball b from the ball b based on a characteristic movement of the ball b flying by describing a predetermined trajectory. For example, the golf club head carries out an almost circular motion with the movement of the golf club to be swung, while the ball b collides with the head and is then launched forward in a direction and a velocity which are definitely different from those of the head. Accordingly, the trajectory d of the ball b can be clearly distinguished from the head. The processing portion recognizes the characteristic movement of the ball b which is obtained immediately after the collision with the head and decides the movement to be an impact. The three-dimensional coordinates of the ball b at a time that the movement is decided to be the impact become the starting point of the trajectory d. In the case in which an insect, a bird or the like flies within the measuring enable range of the radar device 31, the processing portion can distinguish the insect, the bird or the like from the trajectory d. The flying track of the insect, the bird or the like usually has a shape or a velocity which is definitely different from that of the trajectory d of the ball b. The processing portion distinguishes and selects only the data on the ball b in the data on the measured moving objects. The processing portion includes a predetermined software, and the CPU and the memory in the computer portion 33 for operating the software, for example. The processing portion may be provided in the radar device 31. The processing portion includes a predetermined software, and the CPU and the memory in the computer portion 33 for operating the software, for example.

In the case in which the landing position p2 is recognized based on the measurement data obtained by the radar device 31, the landing position p2 can be recognized as a point at which the velocity of the ball b is changed discontinuously. In the case in which the landing position p2 is recognized based on the image data obtained by the CCD camera, the landing position p2 can be recognized on an image basis as an instantaneous point at which a bound is carried out on the ground g. The stop position p3 can be recognized as a final arrival point of the ball b. The ball measuring apparatus 101 has a recognizing portion (not shown) for recognizing the landing position p2 and the stop position p3 based on the change in the velocity of the ball b or the image. The recognizing portion includes a predetermined software, and the CPU and the memory in the computer portion 33 for operating the software, for example.

In the radar device 31, the antenna is fixed without a rotation. The radar device 31 is disposed in such a manner that all of the whole trajectory d, the landing position p2 and the stop position p3 can easily be contained in the measuring range.

The size of the measuring enable region of the radar device 31 depends on a beam width. The moving objects within the beam width can be measured with high precision. The beam width is represented by a half width of a power, for example. The half width indicates an angular width set before a power transmitted from the transmitting antenna is reduced to a half of the greatest value observed in front of the radar.

The radar device 31 is disposed in such a manner that a region from the starting point of the predicted trajectory d to the end point thereof (from the hitting position p1 to the landing position p2) is contained in the beam width.

A beam width $\theta 5$ (see FIG. 9) in a horizontal direction of the radar device 31 is set to be equal to or greater than 10 degrees and to be equal to or smaller than 90 degrees. A beam width $\theta 6$ (see FIG. 8) in a vertical direction of the radar device 31 is set to be equal to or greater than 10 degrees and to be equal to or smaller than 90 degrees. By setting the beam width $\theta 5$ to be equal to or greater than 10 degrees, the whole trajectory d can easily be contained in the beam width also in the case in which the trajectory d bends transversely. It is more preferable that the beam width $\theta 5$ should be set to be equal to or greater than 20 degrees. By setting the beam width $\theta 5$ to be equal to or smaller than 90 degrees, a transmitted electric wave can be prevented from being diffused excessively so that precision in the measurement can be enhanced. It is more preferable that the beam width $\theta 5$ should be set to be equal to or smaller than 80 degrees.

When the beam width $\theta 6$ is set to be equal to or greater than 10 degrees, the range of the trajectory d which can be measured is increased. It is more preferable that the beam width $\theta 6$ should be set to be equal to or greater than 20 degrees. By setting the beam width $\theta 6$ to be equal to or smaller than 90 degrees, the transmitted electric wave can be prevented from being diffused excessively so that the precision in the measurement can be enhanced. It is more preferable that the beam width $\theta 6$ should be set to be equal to or smaller than 80 degrees.

As shown in FIG. 9, the radar device 31 is disposed in such a manner that the beam width $\theta 5$ is almost laterally symmetrical about the line L connecting the hitting position p1 to the target position t. The laterally symmetrical disposition can enhance the tolerance of the measurement for the transverse bend of the trajectory d.

A position in which the radar device is to be disposed is not particularly restricted. The position in which the radar device is to be disposed is not restricted to be placed behind the hitting position p1 as shown in FIG. 8 but may be placed ahead of the target position t. One of the radar devices may be provided on the hitting position p1 side and the other radar devices may be provided on the target position t side. The radar device may be provided in an intermediate position of the hitting position p1 and the target position t. The number of the radar devices to be provided is not particularly restricted.

A position in which the CCD camera is to be disposed is not particularly restricted. The position in which the CCD camera is to be disposed is not restricted to be placed behind the hitting position p1 as shown in FIG. 8 but may be placed ahead of the target position t. One of the CCD cameras may be provided on the hitting position p1 side and the other CCD cameras may be provided on the target position t side. The CCD camera may be provided in an intermediate position of the hitting position p1 and the target position t. The number of the CCD cameras to be provided is not particularly restricted.

In order to obtain three-dimensional information (a three-dimensional azimuth, a three-dimensional velocity and the like) of the ball b, a plurality of receiving antennas (receivers) is required. For this reason, the radar device according to the present invention comprises a plurality of receiving antennas. The three-dimensional information of the ball b are obtained based on a difference in a received electric wave (a receiving signal) between the receiving antennas.

Examples of a method for obtaining the three-dimensional coordinates of the ball b from the three-dimensional information of the ball b include the following first and second methods. In the present invention, both of the first and second methods can be employed. The three-dimensional coordinates of the ball b may be obtained by other methods.

The first method serves to obtain the three-dimensional azimuth of the ball b as the three-dimensional information of the ball b, and furthermore, to obtain a distance between the ball b and the radar device, thereby acquiring the three-dimensional coordinates of the ball b from the three-dimensional azimuth and the distance which are thus obtained.

The second method serves to obtain the three-dimensional velocity of the ball b as the three-dimensional information of the ball b and to successively integrate the three-dimensional velocity thus obtained, thereby acquiring the three-dimensional coordinates of the ball b.

In order to obtain the three-dimensional coordinates of the ball b, it is possible to propose the use of a plurality of radar devices. In the radar devices (1, 2 and 31) according to the present invention, the three-dimensional coordinates of the ball b are obtained by only one of the radar devices. The receiving antennas provided in the radar device can acquire the three-dimensional coordinates by means of one radar device.

In order to obtain the azimuth of the ball b, it is possible to employ a monopulse method, for example. By employing the monopulse method, it is possible to detect a target (that is, the ball b) within a wide range through one transmitting antenna. More specifically, a beam width (also referred to as a beam angle) can be increased to be approximately 100 degrees.

It is possible to calculate the azimuth of the target (the ball b) through the receiving antennas placed in different positions. FIG. 4 shows a received power pattern of the ball b with respect to an azimuth θ in the case in which two receiving antennas are provided. In FIG. 4, "Sum" represents a pattern of a sum signal obtained by signals input to first and second receiving antennas and "Diff" represents a pattern of a difference signal obtained by the signals input to the first and second receiving antennas. The azimuth θ is specified by a sum signal Psum and a difference signal Pdiff of received waves obtained at specific times.

In order to obtain the three-dimensional azimuth of the ball b, azimuths θ in two different directions are required. As a radar device for obtaining the azimuths θ in the two different directions, it is possible to propose radar devices having receiving antennas placed in different positions in a first direction (for example, a vertical direction) and receiving antennas placed in different positions in a second direction (for example, a transverse direction). In this case, at least three receiving antennas are required. One transmitting antenna is enough. Description will be given to the case in which the first direction is set to be the vertical direction and the second direction is set to be the transverse direction. An azimuth (that is, an angle of elevation) in the vertical direction (a perpendicular direction) is obtained based on signals received by the receiving antennas placed in the different positions in the vertical direction. An azimuth in the transverse direction (a horizontal direction) is obtained based on signals received by the receiving antennas placed in different positions in the transverse direction. A three-dimensional azimuth is obtained from the azimuth in the vertical direction and the azimuth in the transverse direction. Four receiving antennas may be provided. For the four receiving antennas, one receiving antenna is provided in each position in the vertical direction and one receiving antenna is provided in each position in the transverse direction separately therefrom, for example. Five receiving antennas or more may be provided.

The distance between the radar device and the ball b can be calculated based on a time required from a transmission to a receipt. Moreover, the distance between the radar device and the ball b can be obtained by receiving an electric wave having two types of frequencies transmitted from the same transmitting antenna through the receiving antennas. The velocity of the ball b can be calculated based on a Doppler shift.

FIG. 5 shows an example of a structure of a ball measuring apparatus capable of calculating the velocity of the ball b and the distance to the ball b. The ball measuring apparatus shown in FIG. 5 has a transmitting antenna 11, a plurality of receiving antennas 12, a calculating portion 13 (or a calculating portion 43 for a radar), a modulator 14 and a transmitter 15. A signal in a millimeter wave zone which is transmitted from the transmitter 15 at a transmission frequency based on a modulation signal sent from the modulator 14 is radiated from the transmitting antenna 11. An electric wave signal reflected and returned from the ball b is received by the receiving antenna 12.

The ball measuring apparatus shown in FIG. 5 has a mixer circuit 17, an analog circuit 18, an A/D converter 19 and an FFT processing portion 20. A frequency of the electric wave signal received by the receiving antenna 12 is converted by the mixer circuit 17. A signal sent from the transmitter 15 is supplied to the mixer circuit 17 in addition to the electric wave signal received by the receiving antenna 12. The mixer circuit 17 mixes the signal sent from the receiving antenna 12 and the signal sent from the transmitter 15. A signal generated by the mixing operation is output to the analog circuit 18. A signal amplified by the analog circuit 18 is output to the A/D converter 19. A signal converted into a digital signal through the A/D converter 19 is supplied to the FFT processing portion 20. The FFT processing portion 20 carries out Fast Fourier Transform (FFT). By the Fast Fourier Transform, information about an amplitude and a phase are obtained from a frequency spectrum of the signal. The information about the amplitude and the phase are supplied to the calculating portion 13 (43). The calculating portion 13 (43) calculates the distance to the ball b and the velocity of the ball b from the information supplied from the FFT processing portion 20.

By utilizing the Doppler shift, it is possible to calculate the velocity of the ball b (a relative velocity of the radar device and the ball b). By utilizing a two-frequency CW (Continuous Wave) method, for example, it is possible to calculate the distance to the ball b (the distance from the radar device to the ball b).

Figure 6:
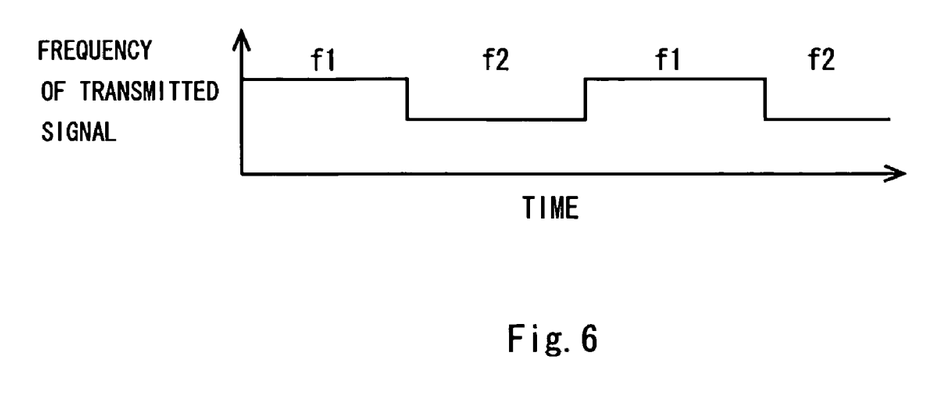
FIG. 6 is a graph showing an example of a relationship between a frequency of a signal transmitted from a transmitting antenna and a time.

In case of the two-frequency CW method, a modulation signal is input to the transmitter 15 and the transmitter 15 supplies two frequencies f1 and f2 to the transmitting antenna 11 while switching them on a time basis. As shown in FIG. 6, the transmitting antenna 11 transmits the two frequencies f1 and f2 with a switch on a time basis. The electric wave transmitted from the transmitting antenna 11 is reflected by the ball b. A reflection signal is received by the receiving antennas 12. The receiving signal and the signal of the transmitter 15 are mixed by the mixer circuit 17 so that a beat signal is obtained. In case of a homodyne method for carrying out a direct conversion to a baseband, the beat signal output from the mixer circuit 17 has a Doppler frequency. A Doppler frequency fd is obtained by the following equation (1).

$$fd = (2f_c/c)v \qquad (1)$$

In the equation (1), $f_c$ represents a carrier frequency, v represents a relative velocity (that is, a velocity of the ball b), and c represents a velocity of light. Received signals at respective transmission frequencies are separated and demodulated by the analog circuit 18 and are A/D converted through the A/D converter 19. Digital sample data obtained by the A/D conversion are subjected to the Fast Fourier Transform processing by the FFT processing portion 20. A frequency spectrum in a full frequency band of the received beat signal is obtained by the Fast Fourier Transform processing. Based on the principle of the two-frequency CW method, a power spectrum of a peak signal having the transmission frequency f1 and a power spectrum of a peak signal having the transmission frequency f2 are obtained for the peak signals obtained as a result of the Fast Fourier Transform processing. Based on a phase difference φ between the two power spectra, a distance R to the ball is calculated by the following equation (2).

$$R=(c\cdot\phi)/(4\pi\cdot\Delta f) \qquad (2)$$

In the equation (2), c represents a velocity of light and Δf represents (f2−f1).

In the way described above, the distance to the ball b and the three-dimensional azimuth of the ball b are grasped so that the three-dimensional coordinates of the ball b are defined univocally.

As described above, it is also possible to calculate the three-dimensional coordinates of the ball b by successively integrating the three-dimensional velocity of the ball b. In order to obtain the three-dimensional velocity of the ball b, the principle of the Doppler shift is utilized. In order to obtain the three-dimensional velocity, it is preferable to provide three receiving antennas or more. It is preferable that all of the receiving antennas should be provided in the radar device. Three receiving antennas or more are placed in different positions from each other. Since the receiving antennas are placed in the different positions, the relative velocities of the receiving antennas and the ball b are different from each other. Based on the relative velocity of each of the receiving antennas and the ball b, the three-dimensional velocity of the ball b is calculated. The three-dimensional velocity is integrated by the calculating portion. The three-dimensional coordinates at each time of the ball b which are obtained by the integration are displayed continuously so that the trajectory d is drawn.

The radar device according to the present invention is a millimeter wave radar. The millimeter wave radar is a radar system using a millimeter wave. The millimeter wave is an electric wave having a wavelength in millimeters. The millimeter wave has a frequency of 30 GHz to 300 GHz. As a radar for measuring a distance, the millimeter wave radar and a laser radar have been known. In particular, the millimeter wave radar can stably catch a target (that is, a ball) also in a state of rain and fog. The millimeter wave radar can carry out a measurement which does not depend on a weather. The millimeter wave radar can carry out the measurement at night without an illumination.

The above description is only illustrative and various changes can be made without departing from the scope of the present invention.

What is claimed is:

1. A ball measuring apparatus for measuring a trajectory of a ball from a hitting position to a landing position, the landing position and a stop position, comprising:
    a first millimeter wave radar device for carrying out a measurement of a trajectory from the hitting position to a predetermined position of the trajectory and including at least one transmitting antenna and a plurality of receiving antennas;
    a second millimeter wave radar device for measuring the stop position and including at least one transmitting antenna and a plurality of receiving antennas; and
    a calculating portion for calculating three-dimensional coordinates of the ball based on signals received by the receiving antennas,
    wherein
        the transmitting antenna and the receiving antenna in the first millimeter wave radar device are disposed between ground level and a height of 5 m from a ground behind the hitting position,
        the transmitting antenna and the receiving antenna in the second millimeter wave radar device are disposed at a height of 2 to 20 m from the ground behind the hitting position, and
        the first millimeter wave radar device and the second millimeter wave radar device are placed in different positions from each other.

2. The ball measuring apparatus according to claim 1, wherein a beam width in a horizontal direction of the first millimeter wave radar device is set to be equal to or greater than 10 degrees and to be equal to or smaller than 90 degrees, and a beam width in a vertical direction of the first millimeter wave radar device is set to be greater than 0 degree and to be equal to or smaller than 90 degrees.

3. The ball measuring apparatus, according to claim 1, wherein a beam width in a horizontal direction of the second millimeter wave radar device is set to be equal to or greater than 10 degrees and to be equal to or smaller than 90 degrees and a beam width in a vertical direction of the second millimeter wave radar device is set to be greater than 0 degree and to be equal to or smaller than 90 degrees.

4. A ball measuring apparatus for measuring a trajectory of a ball from a hitting position to a landing position, the landing position and a stop position, comprising:
    a millimeter wave radar device for measuring the trajectory and including at least one transmitting antenna and a plurality of receiving antennas;
    a CCD camera for measuring the stop position;
    a calculating portion for a radar which serves to calculate three-dimensional coordinates of the ball based on signals received by the receiving antennas; and
    a calculating portion for a camera which serves to calculate coordinates of the stop position based on image data of the CCD camera,
    wherein the millimeter wave radar device and the CCD camera are placed in different positions from each other.

5. The ball measuring apparatus according to claim 4, wherein the CCD camera is disposed at a height of 2 to 20 m from a ground.

6. The ball measuring apparatus according to claim 4, wherein a beam width in a horizontal direction of the millimeter wave radar device is set to be equal to or greater than 10 degrees and to be equal to or smaller than 90 degrees.

7. The ball measuring apparatus according to claim 4, wherein a beam width in a vertical direction of the millimeter wave radar device is set to be equal to or greater than 10 degrees and to be equal to or smaller than 90 degrees.

* * * * *